US012691850B2

(12) United States Patent
Guenther et al.

(10) Patent No.: US 12,691,850 B2
(45) Date of Patent: Jul. 28, 2026

(54) SYSTEMS AND METHODS OF CARGO THEFT DETECTION, HANDLING, AND REPORTING WITH AUTONOMOUS VEHICLES

(71) Applicant: Torc Robotics, Inc., Blacksburg, VA (US)

(72) Inventors: Janine Guenther, Leinfelden (DE); Simon Schaefer, Stuttgart (DE); Carlo Elwinger, Maulbronn (DE)

(73) Assignee: Torc Robotics, Inc., Blacksburg, VA (US)

( * ) Notice: Subject to any disclaimer, the term of this patent is extended or adjusted under 35 U.S.C. 154(b) by 22 days.

(21) Appl. No.: 18/806,326

(22) Filed: Aug. 15, 2024

(65) Prior Publication Data

US 2026/0048717 A1     Feb. 19, 2026

(51) Int. Cl.
| | |
|---|---|
| B60R 25/30 | (2013.01) |
| B60R 25/102 | (2013.01) |
| B60R 25/34 | (2013.01) |
| B60R 25/10 | (2013.01) |

(52) U.S. Cl.
CPC ............ B60R 25/30 (2013.01); B60R 25/102 (2013.01); B60R 25/34 (2013.01); *B60R 2025/1013* (2013.01)

(58) Field of Classification Search
CPC ... B60T 1/00; B60T 1/005; B60T 1/06; B60T 1/067; B60T 7/16; G08B 13/00; G08B 13/14; G08B 13/1427; G08B 13/1436; G08B 13/2417; B60R 25/01; B60R 25/10; B60R 25/33; B60R 25/34; B60R 25/102; B60R 25/30
See application file for complete search history.

(56) References Cited

U.S. PATENT DOCUMENTS

| | | | |
|---|---|---|---|
| 6,737,962 B2 | 5/2004 | Mayor | |
| 10,152,060 B2 | 12/2018 | Gordon et al. | |
| 10,328,896 B2 | 6/2019 | Salter et al. | |
| 2006/0250501 A1 | 11/2006 | Widmann et al. | |
| 2013/0214917 A1* | 8/2013 | Chung | B60R 25/102 340/426.18 |
| 2014/0202800 A1* | 7/2014 | Breed | B60T 7/16 340/568.1 |
| 2019/0344750 A1* | 11/2019 | Takata | B60N 2/0278 |

* cited by examiner

*Primary Examiner* — Van T Trieu
(74) *Attorney, Agent, or Firm* — Armstrong Teasdale LLP

(57)     ABSTRACT

A computer-implemented method of cargo theft management for an autonomous vehicle includes receiving sensor data from one or more sensors of an autonomous vehicle. The computer-implemented method of cargo theft management for an autonomous vehicle also includes determining a theft condition is present by evaluating the sensor data based on a database of theft conditions. Furthermore, the computer-implemented method also includes sending sensor data related to the theft condition to a mission control computing device, where the mission control computing device is a cloud-based computing device. Additionally, the computer-implemented method also includes determining at least one theft response action based on the theft condition. Also, the computer-implemented method includes executing, via the autonomous vehicle, the at least one theft response action.

20 Claims, 9 Drawing Sheets

100

SYSTEMS AND METHODS OF CARGO THEFT DETECTION, HANDLING, AND REPORTING WITH AUTONOMOUS VEHICLES

TECHNICAL FIELD

The field of the disclosure relates generally to autonomous vehicles and, more specifically, cargo theft management with autonomous vehicles.

BACKGROUND OF THE INVENTION

A vehicle and its cargo may be vulnerable to theft when the operator of the vehicle is not present. In most instances the vehicle operator is responsible for detecting, handling, and reporting theft and/or any other criminal activity involving the vehicle. As vehicles become more automated, less operator presence is required and therefore automated vehicles tend to be left unattended. Accordingly, it is desirable to provide theft detection, handling, and reporting without the presence of a vehicle operator.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed computer-implemented method of cargo theft management for an autonomous vehicle includes receiving sensor data from one or more sensors of an autonomous vehicle. The computer-implemented method of cargo theft management for an autonomous vehicle also includes determining a theft condition is present by evaluating the sensor data based on a database of theft conditions. Furthermore, the computer-implemented method also includes sending sensor data related to the theft condition to a mission control computing device, where the mission control computing device is a cloud-based computing device. Additionally, the computer-implemented method also includes determining at least one theft response action based on the theft condition. Also, the computer-implemented method includes executing, via the autonomous vehicle, the at least one theft response action.

In another aspect, the disclosed autonomous vehicle includes one or more sensors. The autonomous vehicle also includes an autonomy computing system, may include at least one processor in communication with at least one memory device. The at least one processor being programed to: receive sensor data from the one or more sensors of the autonomous vehicle; determine a theft condition is present by evaluating the sensor data based on a database of theft conditions; send sensor data related to the theft condition to a mission control computing device, where the mission control computing device is a cloud-based computing device; determine at least one theft response action based on the theft condition; and execute, via the autonomous vehicle, the at least one theft response action.

In yet another aspect, the disclosed autonomy computing system of an autonomous vehicle includes at least one processor in communication with at least one memory device. The at least one processor being programed to:

receive sensor data from the one or more sensors of the autonomous vehicle; determine a theft condition is present by evaluating the sensor data based on a database of theft conditions; send sensor data related to the theft condition to a mission control computing device, where the mission control computing device is a cloud-based computing device; determine at least one theft response action based on the theft condition; and execute, via the autonomous vehicle, the at least one theft response action.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
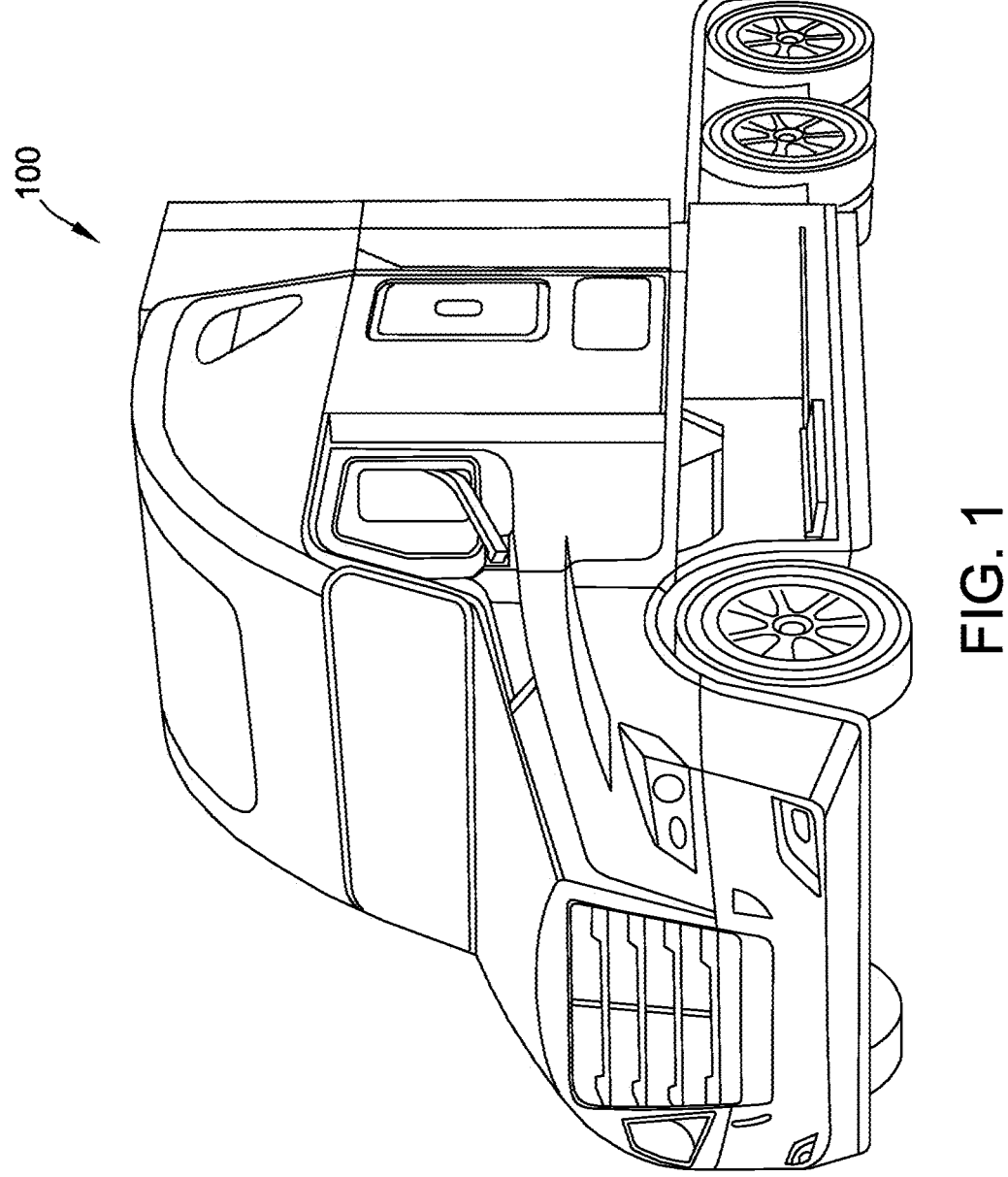
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

Systems and methods of cargo theft detection, handling, and reporting with autonomous vehicles are provided. Because automated vehicles generally do not have operators present while in operation, cargo theft detection, handling, and reporting needs to be managed without operator intervention. In known methods of automated vehicle cargo theft management, smoke, vibration, pressure, and contact sensors are relied upon to detect vehicle tampering. This strategy is unreliable in terms of consistency and accuracy of detecting theft scenarios. A fundamental issue these methods face is the lack of available information. Additionally, many of these methods require the thief to make physical contact with the vehicle, reducing time for handling and reporting the situation. Further, the vehicle should be removed from the scene and a sufficient amount of accurate information should be reported to the operators, authorities, and stakeholders as soon as possible, which the known methods do not provide.

Systems and methods described herein address the above described problems in known systems and methods and are advantageous in providing theft detection, handling, and reporting without requiring the presence of a vehicle operator. In contrast, known methods for vehicle theft management do not reliably detect theft scenarios early enough and/or do not handle and report the situation effectively.

Figure 2:
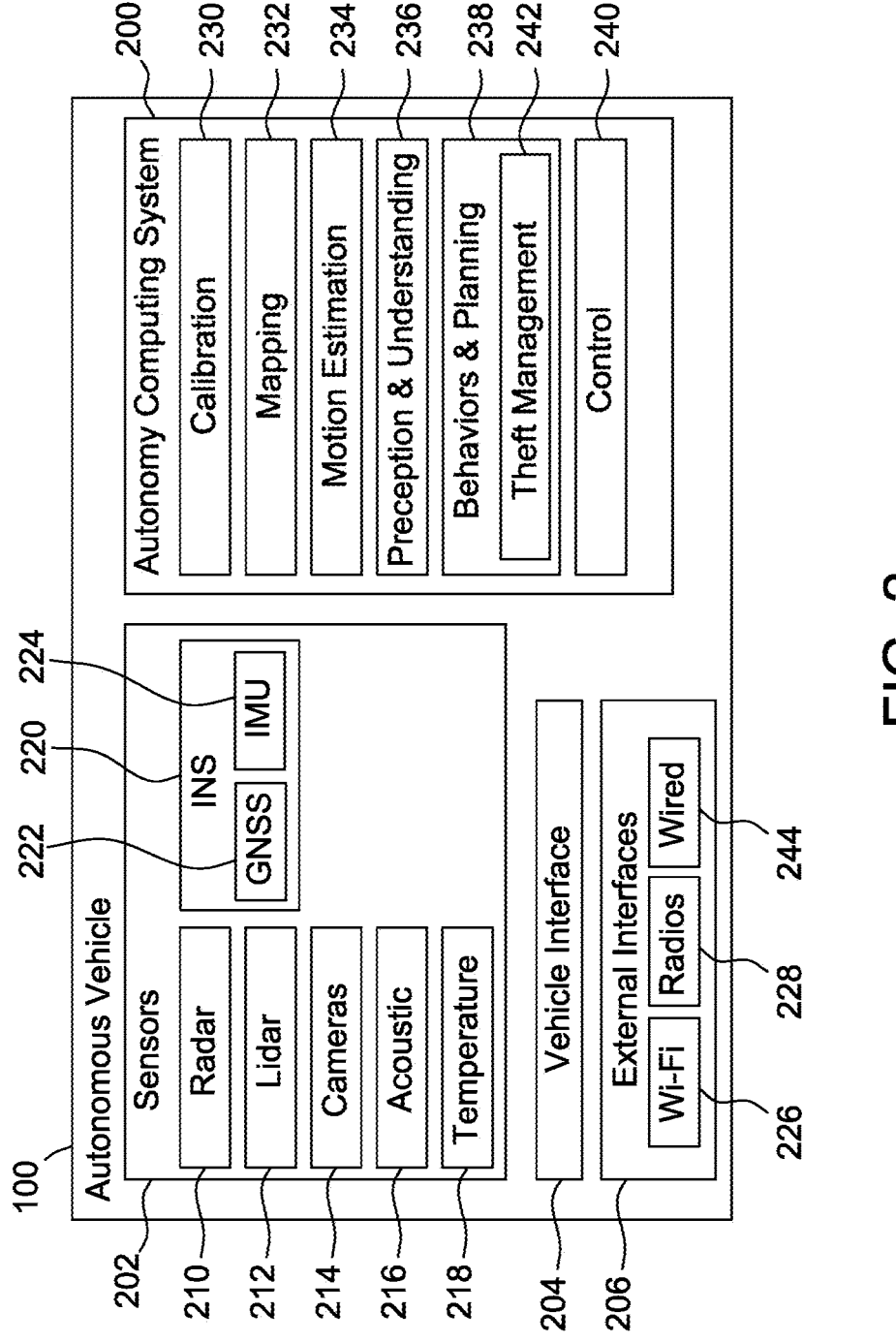
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and theft management module 242. Theft management module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Theft management module 242 detects, handles, and reports theft situations for autonomous vehicle 100 in all conditions, e.g., regardless of setting for a given situation. Theft management module 242 receives, for example, sensor information from perception and understanding module 236 and computes theft responses action based on the theft condition.

Behavior and planning module 238 maintains proper lane position for autonomous vehicle 100 in all conditions, e.g., regardless of signage for given road conditions. Behavior and planning module 238 receives, for example, positions of left or right lane markings from perception and understanding module 236 and computes a lane position offset from the identified lane marking. Where both left and right lane markings are detected by perceptions and understanding module 236, in combination with sensors 202, behavior and planning module 238 selects one lane marking from which lane positioning is derived.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3A:
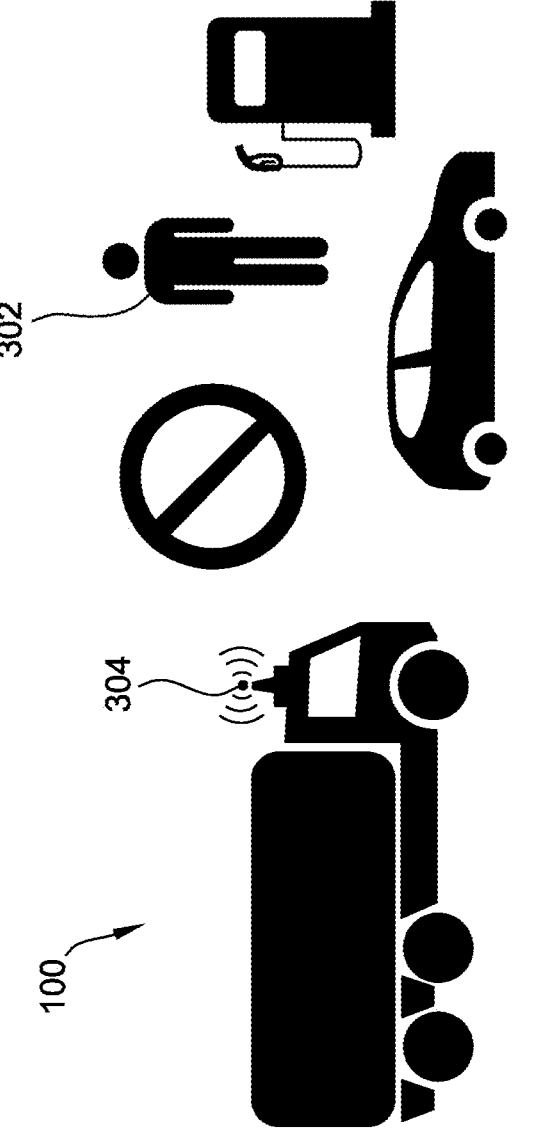
FIG. 3A is a schematic diagram of an autonomous vehicle at a stop.

FIG. 3A is a schematic diagram of autonomous vehicle 100 at a stop. This stop may be expected or unexpected. Nonlimiting examples of an expected stop include traffic jams, fueling, scheduled maintenance, deliveries, and pick-ups. Nonlimiting examples of an unexpected stop include accidents, road blockage, and breakdowns. Overall, a stop may be considered any situation where autonomous vehicle 100 is accessible by unauthorized actors 302.

Figure 3B:
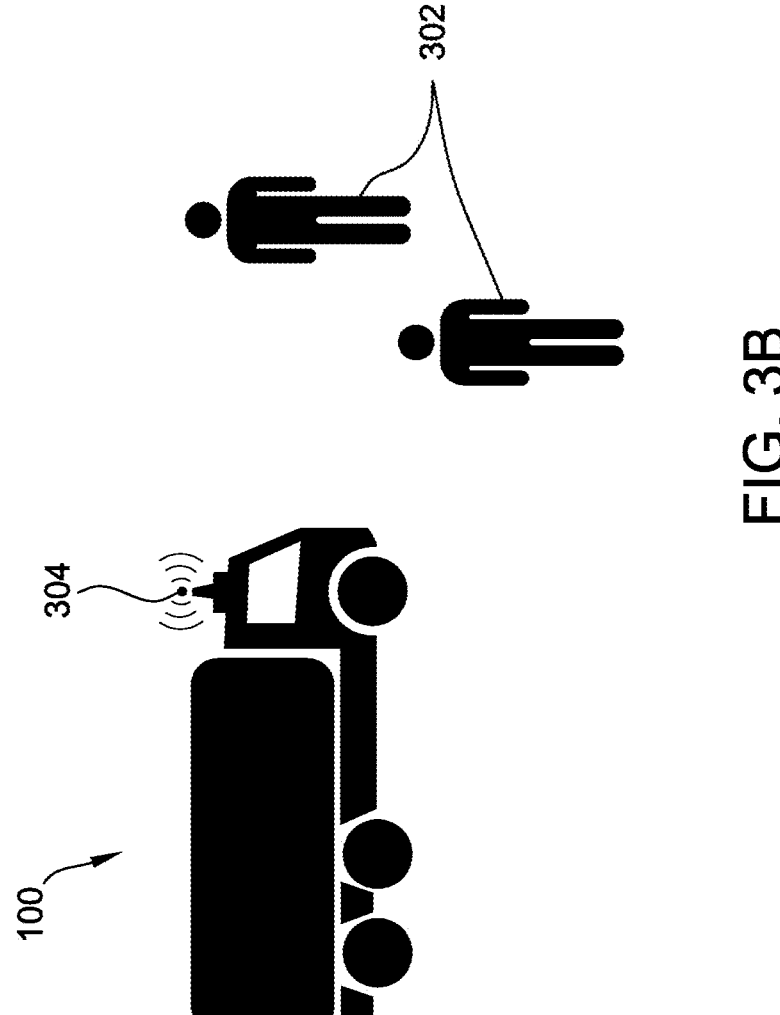
FIG. 3B is a schematic diagram of the autonomous vehicle of FIG. 3A in detecting unauthorized actors approaching.

FIG. 3B is a schematic diagram of autonomous vehicle 100 of FIG. 3A detecting unauthorized actors 302 approaching while at a stop. Autonomous vehicle 100 includes at least one sensor 304 configured to collect information related to the area around autonomous vehicle 100. Any sensor equipped on autonomous vehicle 100 as described above, may be used, individually or in combination with one another, in detecting unauthorized actors. An unauthorized actor 302 is any person or apparatus, e.g., a robotic apparatus, in the vicinity of autonomous vehicle 100 that is not recognized as involved with the mission of autonomous vehicle 100. The data collected from at least one sensor 304 is sent to autonomy computing system 200, including at least one processor 602 in communication with at least one memory device 604. In the example embodiment, a LiDAR sensor 212 is employed as at least one sensor 304 to observe the area around autonomous vehicle 100 while at a stop.

Figure 3C:
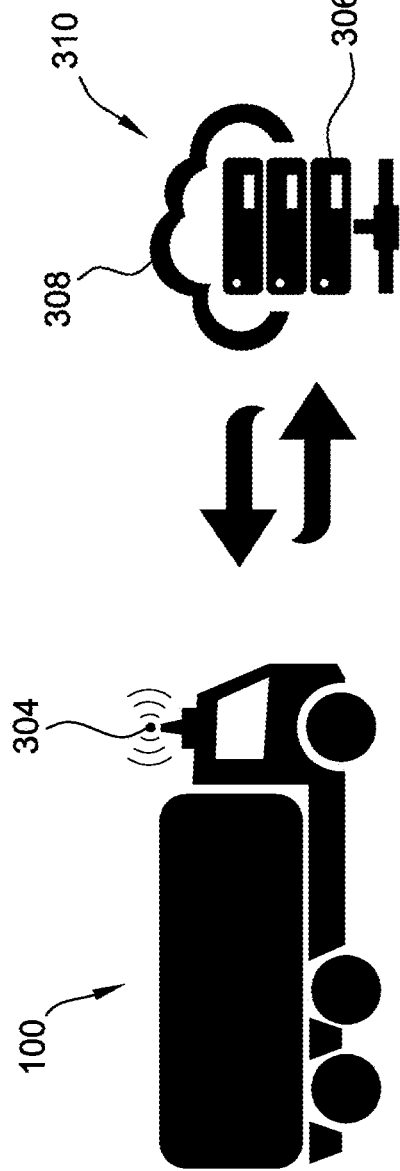
FIG. 3C is a schematic diagram of the autonomous vehicle of FIGS. 3A and 3B evaluating theft situations.

FIG. 3C is a schematic diagram of autonomous vehicle 100 of FIGS. 3A and 3B in evaluating theft situations. With the data from at least one sensor 304, autonomy computing system 200 evaluates the sensed situation against a database 306 of typical cargo theft situations and characteristics. Autonomy computing system 200 may use information including location, population density, route, type of blockage, movements around ego, approaching vehicles/persons, and/or other information when comparing the sensed situation against database 306 of typical cargo theft situations and characteristics. The algorithm for comparing the sensed situation against database 306 of typical cargo theft situations and characteristics may run locally using autonomy computing system 200 or in cloud 308 as part of a mission control computing device 310. Database 306 of typical cargo theft situations and characteristics may be stored locally using autonomy computing system 200 or in cloud 308 as part of mission control computing device 310. Local storage and/or evaluation has the advantage of being independent from the availability of an Internet connection and having increased speed in evaluation and response, while cloud-based storage and/or evaluation reduces requirements onboard compute capacity of autonomous vehicle 100 and possibility of stealing data in cloud 308 from autonomous vehicle 100. The data may be stored and used to improve database 306 of typical cargo theft situations and characteristics for future evaluations.

In the example embodiment, the observation data from at least one sensor 304 is evaluated by comparing the observation data to database 306 of typical cargo theft situations and characteristics using rule-based algorithms, a machine learning (ML) classification model, or via manual inspection. In one example, supervised classification algorithms may be used, where the machine learning model is trained with information and sensor data from previous/reported cargo theft, theft attempts, and characteristics of the scenarios. Example methods implemented in the machine learning model are decision trees, support vector machines, K-means, Bayesian classifier, K-nearest neighbors, regression. The features may be selected based on the relevant data and encompassed location, neighborhood, setting, environment, time of day, weather, number and size/dimensions of approaching actors, and/or speed of approaching actors.

In the example embodiment, autonomy computing system 200 may implement a rule-based algorithm in evaluating the situation. For example, autonomy computing system 200 assigns one of at least two classifications, e.g., no cargo theft situation and cargo theft situation. A no cargo theft situation classification is assigned when no theft situation is detected. A cargo theft situation classification is assigned when a theft situation is detected. In some embodiments, autonomy computing system 200 assigns one of three classifications, e.g., no cargo theft situation, critical situation, and cargo theft situation. The critical situation classification is assigned when a when a possible theft situation is detected.

Figure 3D:
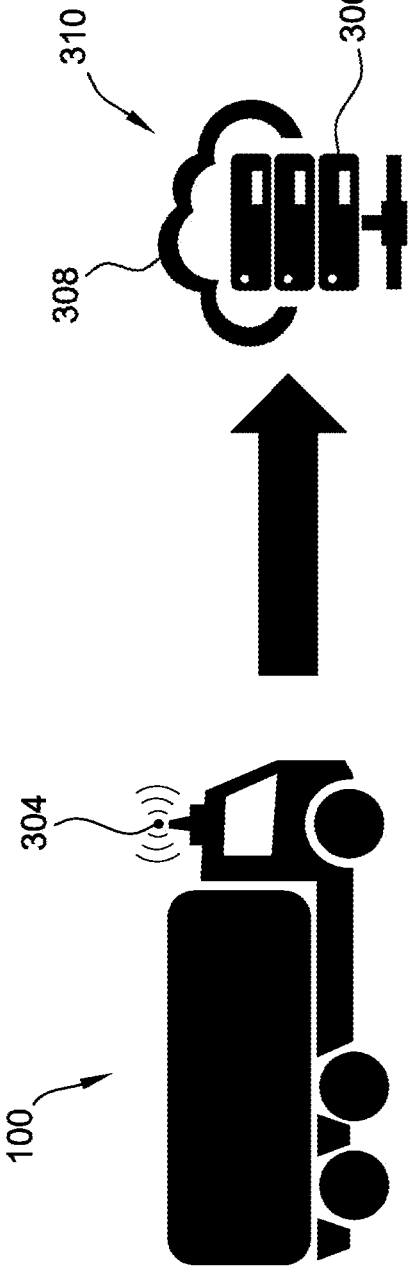
FIG. 3D is a schematic diagram of the autonomous vehicle of FIGS. 3A-3C reporting relevant observation data.

FIG. 3D is a schematic diagram of autonomous vehicle 100 of FIGS. 3A-3C reporting relevant observation data. Once a classification is assigned and associated with a possible or confirmed theft situation, autonomy computing system 200 sends sensor data from at least one sensor 304 related to the theft condition to a mission control computing device 310. The communication may take place over any suitable wireless communication network including via satellite, radio, internet, and/or cellular. In the example embodiment, mission control computing device 310 is in cloud 308.

In the example embodiment, autonomy computing system 200 determines at least one theft response action based on the theft conditions and classification. There may be three types of theft response action including i) theft deterrent actions ii) theft prevention actions and iii) initiating an emergency call.

In the example embodiment, the theft deterrent response actions may include at least one of flashing lights, sounding alarms, and/or playing recorded announcements. Flashing lights may include repeatedly turning on and off any number of lights of autonomous vehicle 100. Sounding alarms may include playing a tone or collection of tones through at least one noise making device, e.g., a speaker or siren. Playing recorded announcements may include repeating messages in one or more languages deterring unauthorized actor 302 from proceeding in a theft attempt. The theft deterrent response actions may also include any other response that is intended to stop unauthorized actor 302 from proceeding in a theft attempt.

In the example embodiment, the theft prevention actions response action may include locking doors, locking drive function of autonomous vehicle 100, and/or identifying an escape route and following the escape route. Locking the doors may include locking at least one of the tractor and/or trailer doors of autonomous vehicle 100. Locking drive function of autonomous vehicle 100 may include locking vehicle control, shutting down engines, and/or disconnecting power/fuel supply. The theft prevention response actions may also include any other response that is intended to stop unauthorized actor 302 from succeeding in a theft attempt. Identifying an escape route and following the escape route may include identifying a route that directs autonomous vehicle 100 away from the potential theft and controlling autonomous vehicle 100 to follow the escape route.

In the example embodiment, the initiating an emergency call theft response may include autonomy computing system 200 notifying other parties depending on the severity of the classifications including local authorities, e.g., law enforcement, and stakeholders, e.g., the cargo owners. In some embodiments, once a critical situation classification is assigned, the observation data from at least one sensor 304 is sent to mission control computing device 310, along with notification to the local authorities and cargo stakeholders. In some embodiments, autonomy computing system 200 may only send mission control computing device 310 the relevant observation data, and mission control computing device 310 may notify other parties. In further alternative embodiments, autonomy computing system 200 may notify other vehicles in the area proximate to the active situation.

Figure 3E:
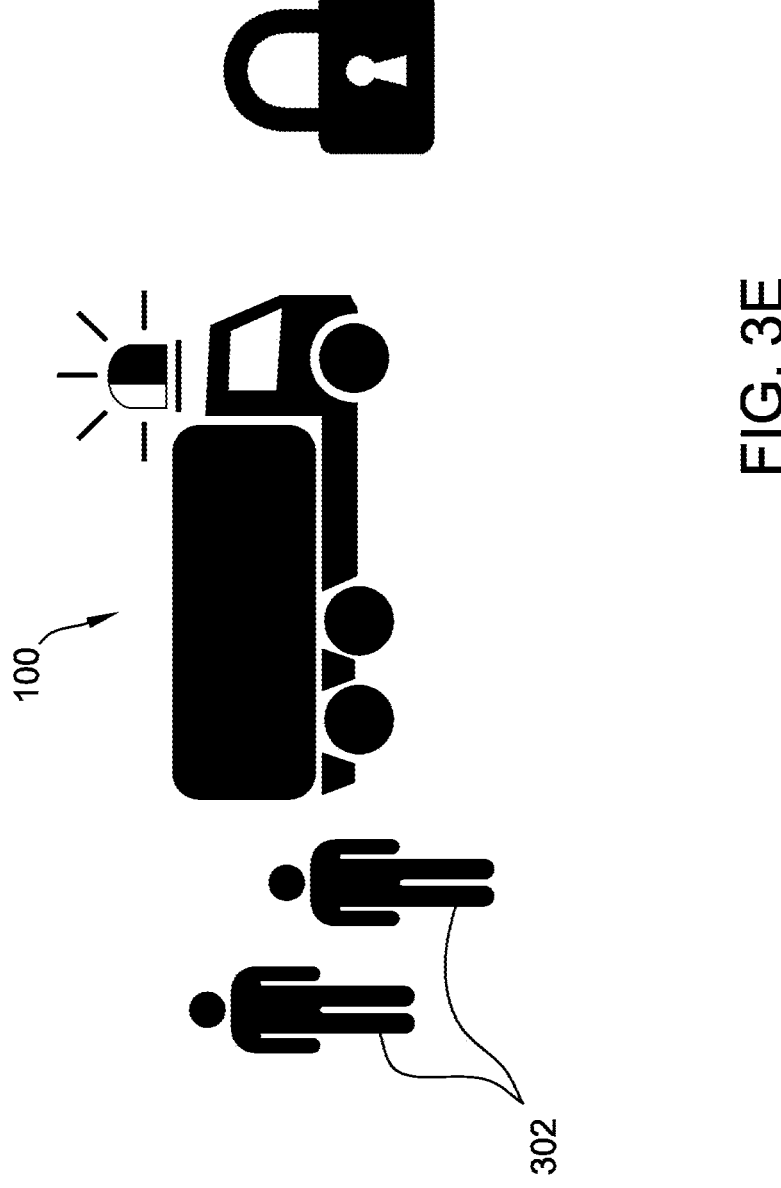
FIG. 3E is a schematic diagram of the autonomous vehicle of FIGS. 3A-3D executing at least one of theft response actions.

FIG. 3E is a schematic diagram of autonomous vehicle 100 of FIGS. 3A-3D executing theft response actions. Once autonomy computing system 200 determines at least one theft response action based on the theft condition, autonomous vehicle 100 executes the at least one theft response action.

Figure 4:
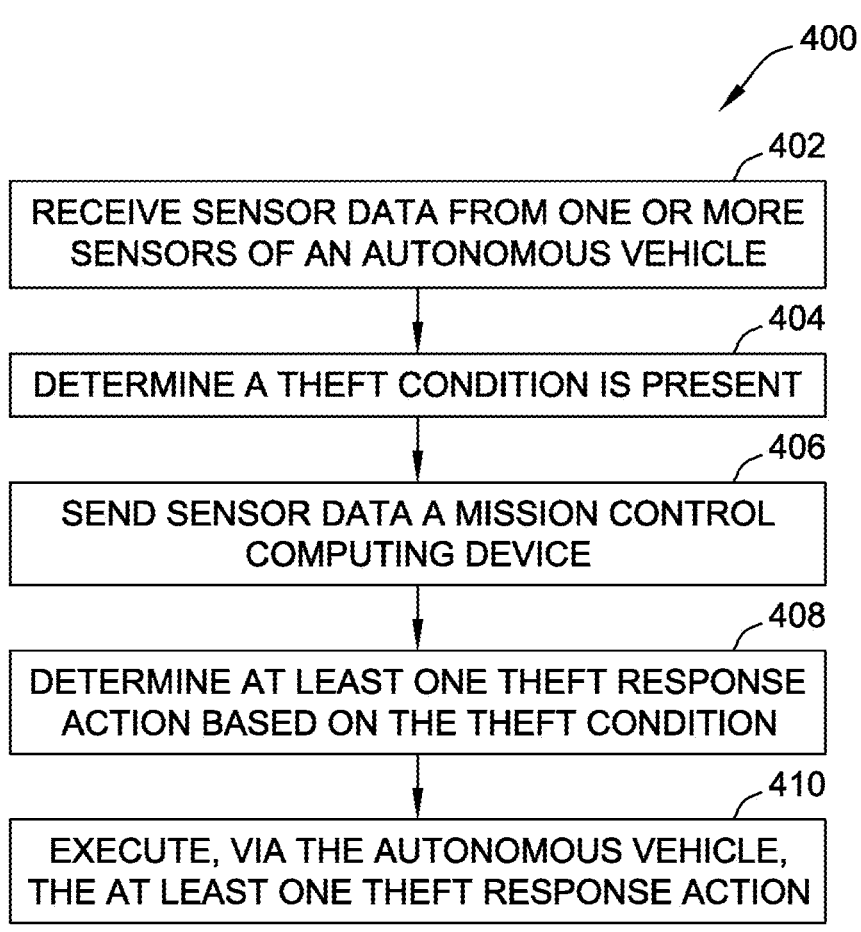
FIG. 4 is a flow chart of an example method of cargo theft management with autonomous vehicles.

FIG. 4 is a flow chart of an example method 400 of cargo theft management with autonomous vehicles. Part or all elements of method 400 may be implemented by autonomy computing system 200 of autonomous vehicle 100. In the example embodiment, method 400 includes receiving 402 sensor data from one or more sensors of an autonomous vehicle. Method 400 also includes determining 404 a theft condition is present by evaluating the sensor data based on a database of theft conditions. Method 400 further includes sending 406 sensor data related to the theft condition to a mission control computing device, wherein the mission control computing device is a cloud-based computing device. Additionally, method 400 includes determining 408 at least one theft response action based on the theft condition. Method 400 also includes executing 410, via the autonomous vehicle, the at least one theft response action.

Figure 5:
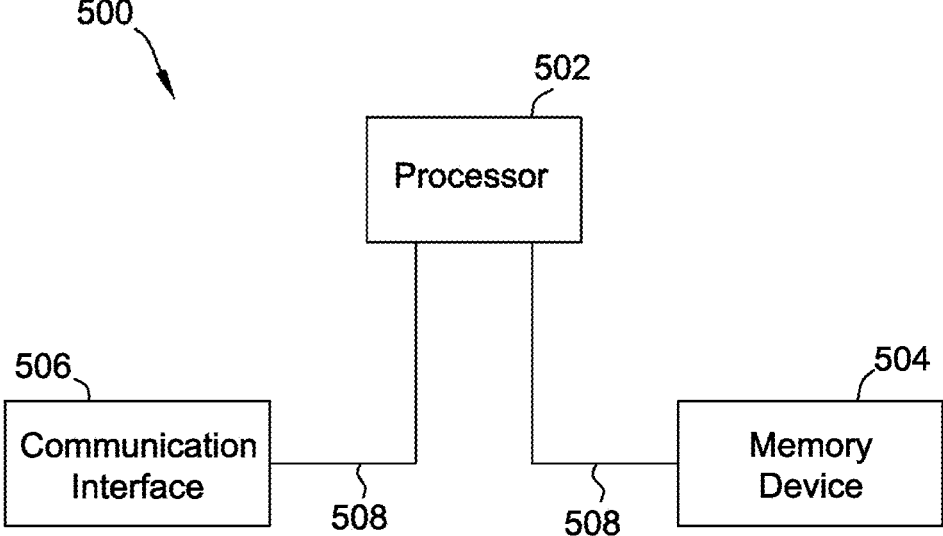
FIG. 5 is a block diagram of an example computing device.

FIG. 5 is a block diagram of an example computing device 500. Autonomy computing device 200 may be implemented with one or more computing devices 500. Computing device 500 includes a processor 502 and a memory device 504. Processor 502 is coupled to memory device 504 via a system bus 508. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, memory device 504 includes one or more devices that enable information, such as executable instructions or other data (e.g., sensor data), to be stored and retrieved. Moreover, memory device 504 includes one or more computer readable media, such as, without limitation, dynamic random access memory (DRAM), static random access memory (SRAM), a solid state disk, or a hard disk. In the example embodiment, memory device 504 stores, without limitation, application source code, application object code, configuration data, additional input events, application states, assertion statements, validation results, or any other type of data. Computing device 500, in the example embodiment, may also include a communication interface 506 that is coupled to processor 502 via system bus 508. Moreover, communication interface 506 is communicatively coupled to data acquisition devices.

In the example embodiment, processor 502 may be programmed by encoding an operation using one or more executable instructions and providing the executable instructions in memory device 504. In the example embodiment, processor 502 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) storing and sending detailed data from the crime scene for investigation and identification of thieves; and preparation of emergency personnel prior to arriving at the crime scene (b) quick notification of authorities to the situation without risk of human injury by automating the reporting of theft situations (c) quick notification of stakeholders for initiating countermeasures or (d) increased probability that thieves are unsuccessful without damage or loss by executing theft prevention and/or deterrent actions via the autonomous vehicle.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A computer-implemented method of cargo theft management for an autonomous vehicle, comprising:
   receiving sensor data from one or more sensors of the autonomous vehicle, the sensor data being of an environment surrounding the autonomous vehicle;
   determining a theft condition is present before a thief makes a physical contact with the autonomous vehicle by:
       evaluating the sensor data based on a database of theft conditions by comparing the sensor data against the database of theft conditions;
   sending sensor data related to the theft condition to a mission control computing device, wherein the mission control computing device is a cloud-based computing device;
   determining at least one theft response action based on the theft condition; and
   executing, via the autonomous vehicle, the at least one theft response action.

2. The method of claim 1, wherein the at least one theft response action includes at least one deterrent action, the at least one deterrent action including at least one of flashing lights, sounding alarms, or playing deterring announcements.

3. The method of claim 1, wherein the at least one theft response action includes at least one theft prevention action, the at least one theft prevention action including at least one of i) locking doors, ii) locking drive function of the autonomous vehicle, or iii) identifying an escape route and following the escape route.

4. The method of claim 1, wherein the at least one theft response action includes initiating an emergency call to at least one of law enforcement, a stakeholder of the autonomous vehicle and/or a cargo of the autonomous vehicle, or one or more other vehicles in an area proximate to the autonomous vehicle.

5. The method of claim 1, wherein evaluating the sensor data further comprises:
   classifying, using a machine learning model, a situation encountered by the autonomous vehicle.

6. The method of claim 1, wherein evaluating the sensor data further comprises:
   classifying, using a rule-based algorithm, a situation encountered by the autonomous vehicle.

7. The method of claim 1, wherein evaluating the sensor data further comprises: evaluating, via the mission control computing device, the sensor data based on the database of theft conditions.

8. The method of claim 1, wherein evaluating the sensor data further comprises:
   evaluating, via an autonomy computing system of the autonomous vehicle, the sensor data based on the database of theft conditions.

9. An autonomous vehicle, comprising:
   one or more sensors; and
   an autonomy computing system, comprising at least one processor in communication with at least one memory device, and the at least one processor programed to:
       receive sensor data from the one or more sensors of the autonomous vehicle, the sensor data being of an environment surrounding the autonomous vehicle;
       determine a theft condition is present before a thief makes a physical contact with the autonomous vehicle by:
           evaluating the sensor data based on a database of theft conditions by comparing the sensor data against the database of theft conditions;
       send sensor data related to the theft condition to a mission control computing device, wherein the mission control computing device is a cloud-based computing device;
       determine at least one theft response action based on the theft condition; and
       execute, via the autonomous vehicle, the at least one theft response action.

10. The autonomous vehicle of claim 9, wherein the at least one theft response action includes at least one deterrent action, the at least one deterrent action including at least one of flashing lights, sounding alarms, or playing deterring announcements.

11. The autonomous vehicle of claim 9, wherein the at least one theft response action includes at least one theft prevention action, the at least one theft prevention action including at least one of i) locking doors, ii) locking drive function of the autonomous vehicle, or iii) identifying an escape route and following the escape route.

12. The autonomous vehicle of claim 9, wherein the at least one theft response action includes initiating an emergency call to at least one of law enforcement, a stakeholder of the autonomous vehicle and/or a cargo of the autonomous vehicle, or one or more other vehicles in an area proximate to the autonomous vehicle.

13. The autonomous vehicle of claim 9, wherein the at least one processor is further programmed to:
   classify, using a machine learning model, a situation encountered by the autonomous vehicle.

14. The autonomous vehicle of claim 9, wherein the at least one processor is further programmed to:
   classify, using a rule-based algorithm, a situation encountered by the autonomous vehicle.

15. An autonomy computing system of an autonomous vehicle, comprising at least one processor in communication with at least one memory device, and the at least one processor programmed to:
   receive sensor data from one or more sensors of the autonomous vehicle, the sensor data being of an environment surrounding the autonomous vehicle;

determine a theft condition is present before a thief makes a physical contact with the autonomous vehicle by:

evaluate the sensor data based on a database of theft conditions by comparing the sensor data against the database of theft conditions;

send sensor data related to the theft condition to a mission control computing device, wherein the mission control computing device is a cloud-based computing device;

determine at least one theft response action based on the theft condition; and execute, via the autonomous vehicle, the at least one theft response action.

16. The autonomy computing system of claim 15, wherein the at least one theft response action includes at least one deterrent action, the at least one deterrent action including at least one of flashing lights, sounding alarms, or playing deterring announcements.

17. The autonomy computing system of claim 15, wherein the at least one theft response action includes at least one theft prevention action, the at least one theft prevention action including at least one of i) locking doors, ii) locking drive function of the autonomous vehicle, or iii) identifying an escape route and following the escape route.

18. The autonomy computing system of claim 15, wherein the at least one theft response action includes initiating an emergency call to at least one of law enforcement, a stakeholder of the autonomous vehicle and/or a cargo of the autonomous vehicle, or one or more other vehicles in an area proximate to the autonomous vehicle.

19. The autonomy computing system of claim 15, wherein the at least one processor is further programmed to:

classify, using a machine learning model, a situation encountered by the autonomous vehicle.

20. The autonomy computing system of claim 15, wherein the at least one processor is further programmed to:

classify, using a rule-based algorithm, a situation encountered by the autonomous vehicle.

\* \* \* \* \*